United States Patent [19]
Mohri et al.

[11] Patent Number: 5,500,500
[45] Date of Patent: Mar. 19, 1996

[54] PROCESS AND APPARATUS FOR ELECTRIC DISCHARGE POSITION DETECTION

[75] Inventors: Naotake Mohri, Nagoya; Hideo Moronuki, Toyota, both of Japan

[73] Assignee: Toyota Jidosha Kabushiki Kaisha, Aichi, Japan

[21] Appl. No.: 401,244

[22] Filed: Mar. 9, 1995

[30] Foreign Application Priority Data

Mar. 17, 1994 [JP] Japan .................................. 6-047134

[51] Int. Cl.⁶ .................................................. B23H 1/02
[52] U.S. Cl. .................... 219/69.17; 219/69.13; 219/69.18
[58] Field of Search ................. 219/69.13, 69.18, 219/69.17, 69.16, 69.19

[56] References Cited

U.S. PATENT DOCUMENTS

| | | | |
|---|---|---|---|
| 3,987,269 | 10/1976 | Inoue et al. | 219/69.17 |
| 4,575,605 | 3/1986 | Martin | 219/69.13 |
| 4,963,711 | 10/1990 | Obara | 219/69.13 |

FOREIGN PATENT DOCUMENTS

| | | | |
|---|---|---|---|
| 4117620 | 12/1991 | Germany | 219/69.18 |
| 3-111121 | 5/1991 | Japan | 219/69.17 |
| 4-75818 | 3/1992 | Japan | 219/69.17 |
| 6-8052 | 1/1994 | Japan | 219/69.17 |
| 9406592 | 3/1994 | WIPO | 219/69.18 |

OTHER PUBLICATIONS

"Observation of Electric Discharge Points Distribution in Electric Discharge Machining", Electric Machining Technique, vol. 15, No. 49 (1991), pp. 13–22.

"Finish Machining by EDM Using Powder Suspended Working Fluid", Electric Machining Journal, vol. 25, No. 49, pp. 47–60, Naotake Mohri et al., Oct. 1990.

*Primary Examiner*—Geoffrey S. Evans
*Attorney, Agent, or Firm*—Oliff & Berridge

[57] ABSTRACT

A process of detecting the position of generation of electric discharge between a discharge electrode of an electric discharge machine and a work. The process comprises the steps of branching a pulse discharge current into two or more branch power supply lines and supplying discharge current divisions to a discharge electrode from two or more points through the respective branch power supply lines, detecting the discharge current divisions in the branch power supply lines, calculating the peak value of each of the discharge current divisions at the time of rising of the pulse discharge current, standardizing the peak value of each of the discharge current divisions, and calculating electric discharge generation position according to the standardized peak value. In this process, the electric discharge generation position detection is performed without restriction imposed by the pulse length or by the electrode material.

6 Claims, 11 Drawing Sheets

1

PROCESS AND APPARATUS FOR ELECTRIC DISCHARGE POSITION DETECTION

BACKGROUND OF THE INVENTION

1. Field of the Invention

This invention relates to a process of detecting the position of electric discharge generated between a discharge electrode of an electric discharge machine and a work and also to a process of electric discharge machining which permits electric discharge machining to be continued in a satisfactory state according to detected position information obtained by the electric discharge position detection process.

2. Description of the Prior Art

A discharge electrode of an electric discharge machine usually has a certain extent. For example, the discharge electrode of a wire electric discharge machine extends linearly (i.e., one-dimensionally), while the discharge electrode of a die sinking electric discharge machine extends plane-wise (i.e., two- or three-dimensionally). In the electric discharge machine, the machining is continued by generating electric discharge between the discharge electrode and the work. While the machining is being done, it is impossible to control the exact position in the discharge electrode having the certain extent where electric discharge is generated. However, the electric discharge generation position in the discharge electrode is closely related to the result of machining. For example, where electric discharge generation positions are concentrated in the discharge electrode, satisfactory result of machining can not be obtained. Where machining is made with electric discharge generation positions distributed uniformly, satisfactory result of machining can be obtained. It is thus desired to be able to detect the position of electric discharge in the discharge electrode generated during machining.

Concerning this purpose, a report entitled "Observation of Electric Discharge Points Distribution in Electric Discharge Machining" is provided in Electric Machining Technique (Journal of the Society of Electric Machining Engineers of Japan) Vol. 15, No. 49 (1991), pp. 13–22. The report proposes a technique of detecting electric discharge generation position in the following way. A figure in the report is annexed as FIGS. 11(A) and 11(B) to the present specification.

(1) A power supply line X for supplying discharge current $i0$ is branched into two or more branch power supply lines X1, X2, . . . which are connected at different points Y1, Y2, . . . to a discharge electrode Z.

(2) With this arrangement, the discharge current $i0$ that is supplied through the line X is branched into two or more branch power supply lines X1, X2, . . . , and the discharge current divisions $i1, i2, \ldots$ are supplied from the two or more points Y1, Y2, . . . through the two or more branch power supply lines X1, X2, . . . to the discharge electrode Z.

(3) The discharge current divisions $i1, i2, \ldots$ flowing through the branch power supply lines X1, X2, . . . are detected upon reaching of the steady state (i.e., at timings of T2 to T3, T6 to T7, and T10 to T11 in FIG. 11(B)).

(4) The discharge current divisions $i1, i2, \ldots$ are each standardized after an equation $(i1-i2)/(i1+i2)$. The standardized value that is obtained in this way, is zero when $i1 > i2$, and has a positive value when $i1\ i2$ and has a negative value when $i1 < i2$.

(5) As is obvious from the equivalent circuit shown in FIG. 11(A), $i1=i2$ takes place when $r0+rc+R1=r0+rc+R2$, that is, $R1=R2$, where $r0$ is the resistance of each of the branch power supply lines X1 and X2, $rc$ is the contact resistance of each branch power supply line with respect to the discharge electrode Z, R1 is the resistance of the discharge electrode Z between the connection point Y1 and the electric discharge generation position S, and R2 is the resistance of the discharge electrode Z between the connection point Y2 and the electric discharge generation position S. Obviously, with electric discharge generation at the mid point between the connection points Y1 and Y2, $R1=R2$ is obtained, and the standardized value is zero (see timings T9 to T12). When the connection point Y1 is approached by the electric discharge generation position S, we have $i1>i2$ (see timings T1 to T4), and the standardized value is positive. If the value is large, the electric discharge generation position S is close to the connection point Y1. When the connection point Y2 is approached by the electric discharge generation position S, we have $i1<i2$ (see timings T5 to T8), and the standardized value is negative. The greater the absolute value, the closer the electric discharge generation position S is to the connection point Y2. FIG. 12(A) shows the relation between the standardized value and the electric discharge generation position S. The position S is shown as a distance from the connection point Y1.

(6) In this technique, the electric discharge generation position S is detected according to the standardized value based on the theory described in (5). More specifically, the standardized value is obtained, and the electric discharge generation position is calculated from this value and the relation shown in FIG. 12(A). For removing the influence of induced electromotive force, the discharge current detection in the step in (3) is made after the discharge current divisions $i1, i2, \ldots$ have reached substantially the steady state.

In the commonly termed coarse machining, a large discharge current pulse length is taken, and a substantially steady state is obtained by the discharge current divisions in every time of pulse energization. Thus, in the prior art, it is possible to obtain electric discharge generation position detection.

However, when the pulse length is reduced for satisfactory machining, the pulse energization in every time may be ended before reaching of the steady state, thus making it impossible to detect the discharge current divisions $i1, i2, \ldots$ without the influence of induced electromotive force. Besides, the necessity for the electric discharge generation position detection is particularly high in a finish machining stage with reduced pulse length. Therefore, in the prior art process, the electric discharge generation position can not be detected when it is most desired to know the position.

As is obvious from the above description in (5), in the prior art, the electric discharge generation position detection is made by utilizing the electrode resistances R1 and R2 of the discharge electrode Z from the connection points Y1 and Y2 to the electric discharge generation position S. Therefore, if the discharge electrode Z is made of copper or like low resistivity material, the sensitivity of detection is reduced, and in the case of the copper electrode, the electric discharge generation position detection is substantially impossible. FIG. 12(B) shows relation in case of using a copper electrode. In this case, the standardized value is not changed virtually with the electric discharge generation position.

SUMMARY OF THE INVENTION

The present invention seeks to provide a technique for detecting the position of generated electric discharge irrespective of the pulse length or the electrode material. In addition, the invention seeks to provide a technique of permitting electric discharge machining to be continued in a satisfactory machining state by using electric discharge generation position information that is detectable in the above way.

One of the processes according to the invention is a process of detecting position at which electric discharge is generated between a discharge electrode of an electric discharge machine and a work. As schematically shown in FIGS. 1(A) and 1(B), the process comprises a step M1 of dividing a pulse discharge current i0 into two or more branch power supply lines X1, X2, ... and supplying the discharge current divisions i1, i2, ... from two or more points Y1, Y2, ..., through the respective branch power supply lines X1, X2, ... to a discharge electrode Z, a step M2 of detecting the discharge current divisions i1, i2, ... in the branch power supply lines X1, X2, ..., a step M3 of calculating peaks iP1, iP2, ... of the individual discharge current divisions i1, i2, ... at the time of rising of the pulse discharge current i0, a step M4 of standardizing the peaks iP1, iP2, ... of the discharge current divisions, and a step M5 of calculating the position of generated electric discharge according to the standardized peak value IP.

This process utilizes the discharge current division peaks iP1, iP2, ... at the time of rising of the pulse discharge current i0. In other words, no value is used, which is detectable only after a steady state has been set up. For this reason, this process permits electric discharge generation position detection without any restriction on the pulse length.

The peak current obtained at the time of rising is a high frequency current and is thought to flow mainly through skin part of the discharge electrode Z. Actually, even where copper or like low resistivity material is used for the discharge electrode, the standardized value IP well corresponds to the electric discharge generation position (as empirically confirmed as will be described later), thus permitting the detection of the electric discharge generation position without restriction by the electrode material.

The other process according to the invention is a process of electric discharge machining that is performed while detecting the position at which electric discharge is generated between a discharge electrode of an electric discharge machine and a work. As schematically shown in FIGS. 1(A) and 1(B), the process comprises a step M1 of dividing a pulse discharge current i0 into two or more branch power supply lines X1, X2, ... and supplying the discharge current divisions i1, i2, ... from two or more points Y1, Y2, ... through the respective branch power supply lines X1, X2, . . . to a discharge electrode Z, a step M2 of detecting the discharge current divisions i1, i2, ... in the branch power supply lines X1, X2, ..., a step M3 of calculating peaks iP1, iP2, ... of the individual discharge current divisions i1, i2, ... at the time of rising of the pulse discharge current i0, a step M4 of standardizing the discharge current division peaks iP1, iP2 ..., a step M5 of calculating the electric discharge generation position according to the standardized peak value IP, a step M6 of judging from changes in the calculated electric discharge generation positions whether the electric discharge generation positions are concentrated or dispersed, and a step M7 of updating machining conditions when the electric discharge generation positions are concentrated.

This electric discharge machining process includes the electric discharge generation position detection processes described above and permits electric discharge generation position detection without being affected by the pulse length or electrode material. Thus, with this system, it is possible to obtain the electric discharge generation position detection without any restriction imposed on the pulse length. With the detection of the electric discharge generation positions, it is possible to judge from position changes whether the electric discharge generation positions are locally concentrated or dispersed over the whole area. If the positions are concentrated, machining condition updating is made in the step M7, thus making up for the concentration. The process thus permits continuing the electric discharge machining by maintaining a satisfactory machining state.

BRIEF DESCRIPTION OF THE DRAWINGS

The above and other objects, features and advantages of the invention will become more apparent from the following detailed description of the preferred embodiment when the same is read with reference to the accompanying drawings, in which.

DETAILED DESCRIPTION OF THE PREFERRED EMBODIMENT

Figure 1A:
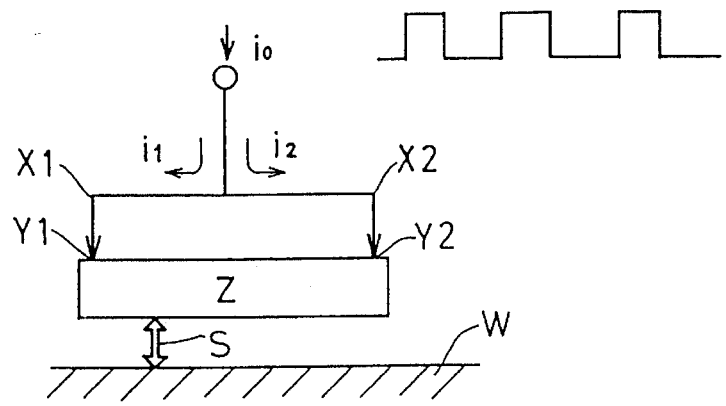
FIGS. 1(A) and 1(B) schematically illustrate the concept underlying the invention.
Figure 1B:
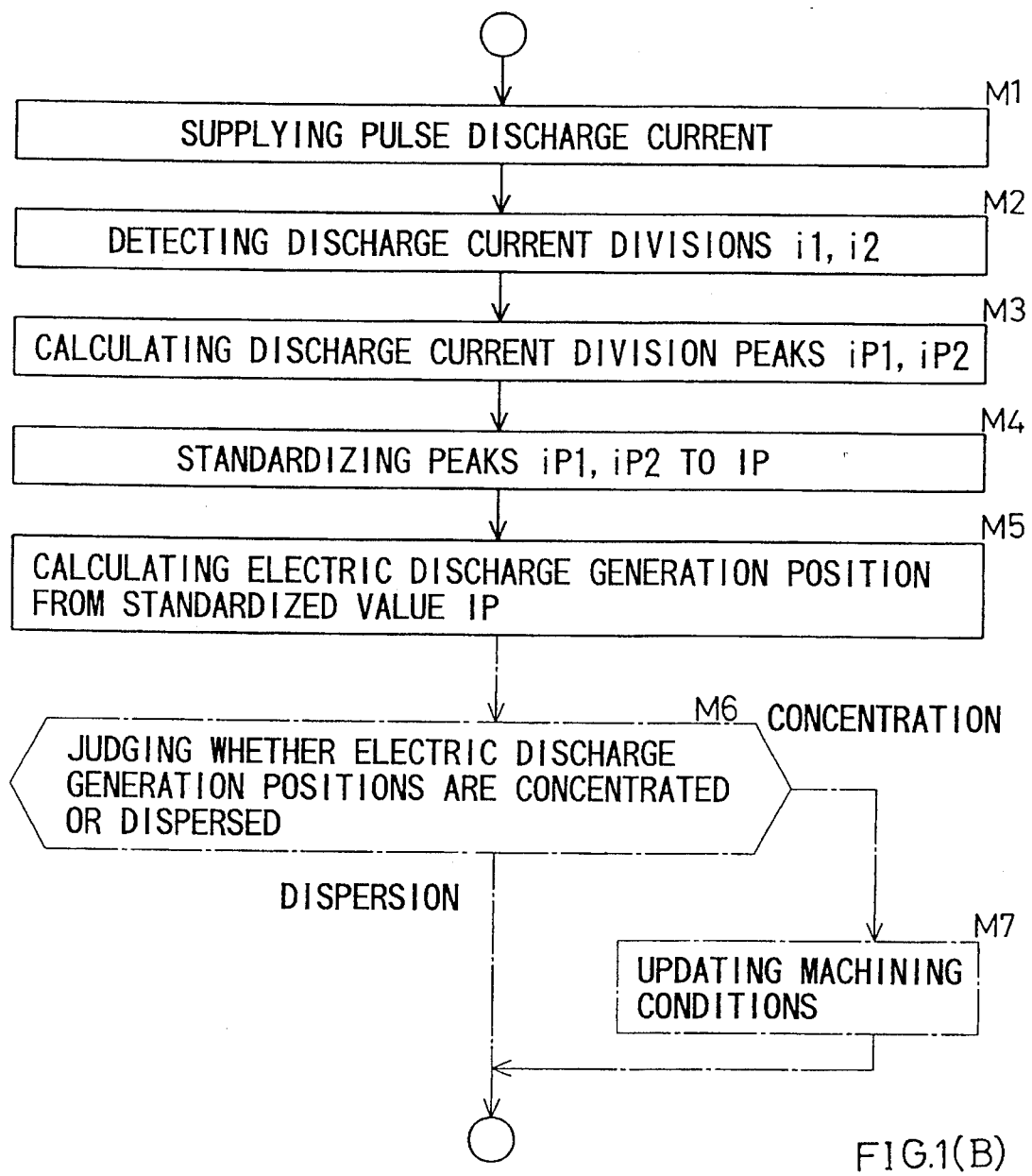
Figure 2:
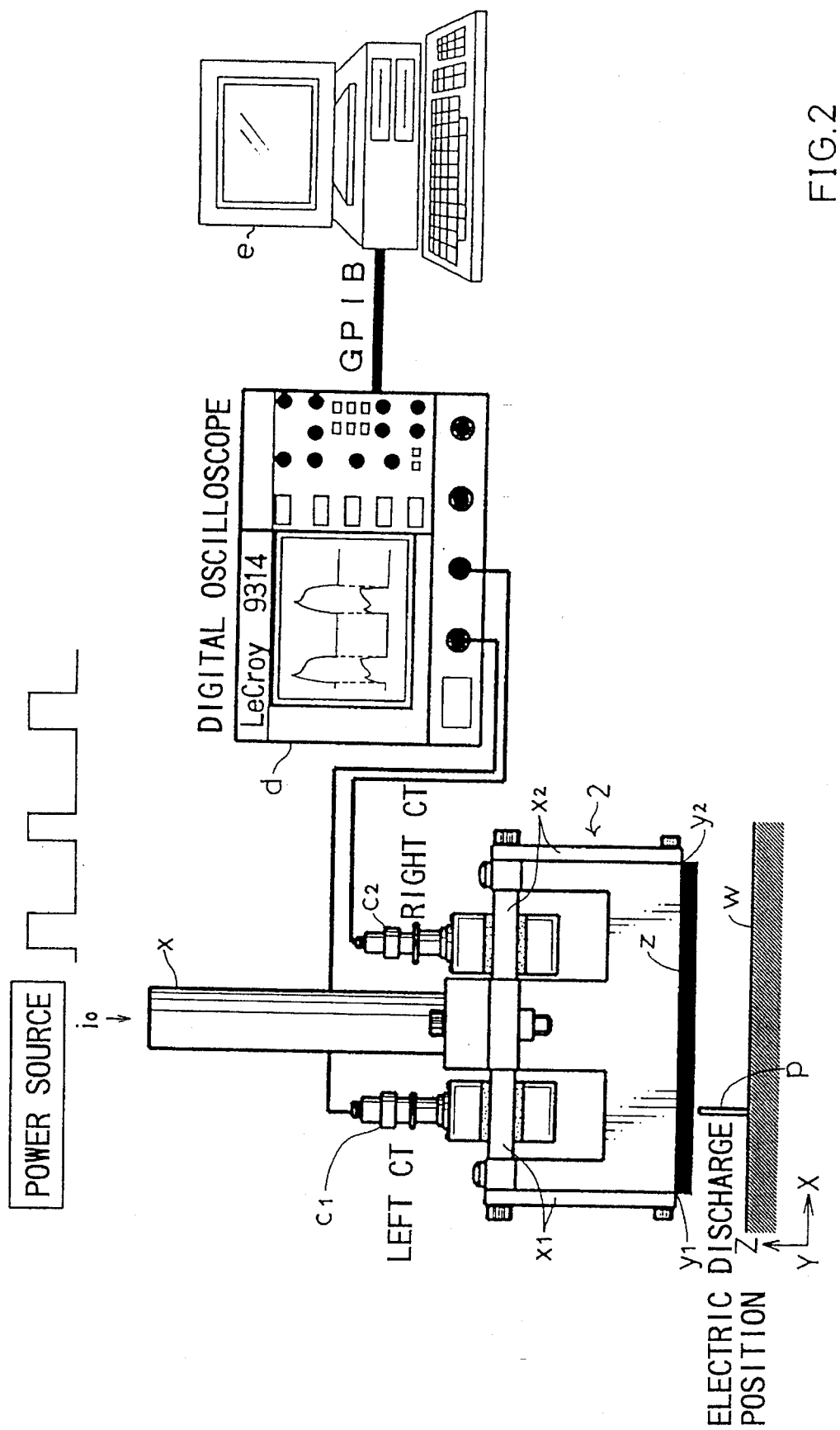
FIG. 2 is a view showing an example of system for carrying out the detection process.

In the first place, an example of a system for carrying out the process of electric discharge generation position detection will be described with reference to FIG. 2. In FIG. 2, designated at x is a power supply rod for supplying discharge current i0. The rod x has its upper end connected to an electric discharge machine controller (not shown) including an internal power source. The power source applies a series of pulsed voltage to the power supply rod X. The electric discharge machine controller can utilize commercially available equipment, and it can control a voltage applied to an electrode and the pulse length when applying the voltage in the form of pulses.

The power supply rod x has its lower end branching into two branches to which branch power supply rods x1 and x2 for supplying discharge current divisions are connected. A discharge electrode z is selectively connected to the lower end of the branch power supply rods x1 and x2 at points y1 and y2. In this embodiment, the rods x, x1 and x2 are all made of copper and have low resistivity. In addition, they are connected to one another by bolting, thus providing for reduced contact resistance. The entirety of the electrode section 2 is mounted in an XYZ movement mechanism (not shown). The XYZ movement mechanism is controlled by the electric discharge machine controller. The individual coordinate axes are in directions as shown in FIG. 2.

In the actual electric discharge machining, a predetermined voltage is applied to the discharge electrode z, and the position of the electrode section 2 in the z-axis direction is controlled such that the electric discharge phenomenon is generated with an adequate probability in this state. In a coarse machining stage, a low voltage is applied to the discharge electrode z. Thus, machining is made in a state that the distance between the discharge electrode z and a work w is small. In a finish machining stage, a high voltage is applied to the discharge electrode z. Thus, machining is made in a state that the distance between the discharge electrode z and the work w is large. The usual electric discharge machine controller includes a superimposing circuit for increasing the voltage applied to the discharge electrode z for the finish machining stage.

Referring to FIG. 2, designated at C1 and C2 are respectively ampere meters for detecting discharge current divisions flowing through the branch power supply rods x1 and x2. The ampere meters C1 and C2 employ AC sensors which can detect high frequency current up to about 35 MHz. The outputs of the ampere meters C1 and C2 are inputted to a digital oscilloscope d. The digital oscilloscope d is capable of 2-channel inputs, and it can store data at 300 MHz (with a sampling interval of 100 msec.). To the oscilloscope d is connected a computer e to which discharge current divisions data obtained by high speed sampling is transferred in a timed relation to the processing speed of the computer e. The oscilloscope d is used as a recorder for recording discharge current divisions. If the data sampling speed of the computer e is comparable to the processing speed of the digital oscilloscope d, there is no need for once recording data at high speed in the digital oscilloscope d. The computer e is used as a calculator for calculating peak values, standardizing peak values and calculating an electric discharge generation position, as will be described later.

FIG. 2 shows a status of execution of a preparation step of generating electric discharge at a known position in the discharge electrode z and measuring discharge current divisions i1 and i2 that are caused at this time. A pin p made of a metal is held upright on the work w to let electric discharge generate at the pin p. The XYZ movement mechanism noted above causes movement of the electrode section 2 in the X direction. When the position of the pin p corresponds to the connection point y1, electric discharge is generated right underneath the connection point y1. When the pin p corresponds in position to the mid way between the connection points y1 and y2, electric discharge is generated at the center of the discharge electrode z. When the position of the pin p corresponds to the connection point y2, electric discharge is generated right underneath the connection point y2.

Figure 3B:
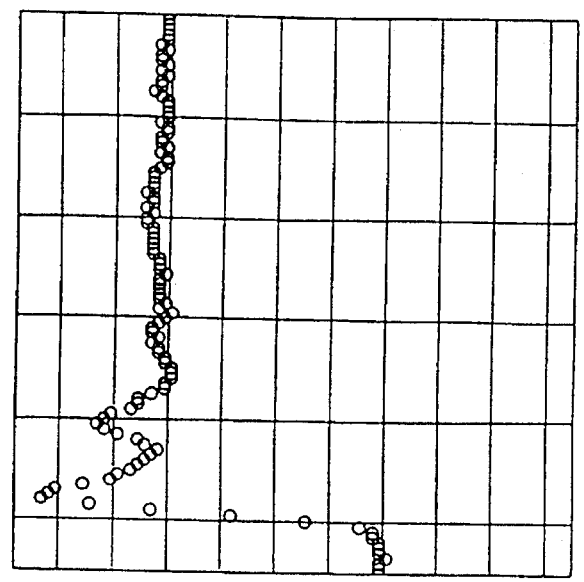
FIGS. 3(A) and 3(B) are graphs showing examples of detected discharge current division.
Figure 3A:
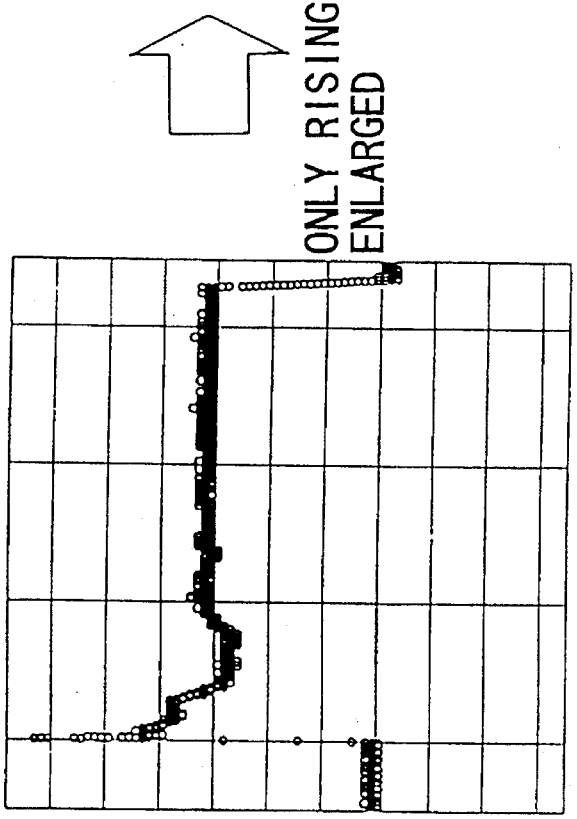

FIGS. 3(A) and 3(B) show an example of the detected discharge current division i1 that flows through the branch power supply rod x1 with application of a pulse discharge current i0 to the power supply rod x. FIG. 3(B) shows the relation to an enlarged scale at the time of rising of the pulse discharge current i0. As is seen from the FIGS. 3(A) and 3(B), a sharp peak is observed at the time of rising. This phenomenon corresponds to far high frequency compared to the influence of the induced electromotive force, and it was observed for the first time owing to the use of a system which is capable of detection and recording of high frequency phenomenon like the system according to the invention. Currently, it is estimated that the peak is produced by the phenomenon of electron avalanche produced between the discharge electrode z and the work w at the time of the start of discharge.

Figure 4B:
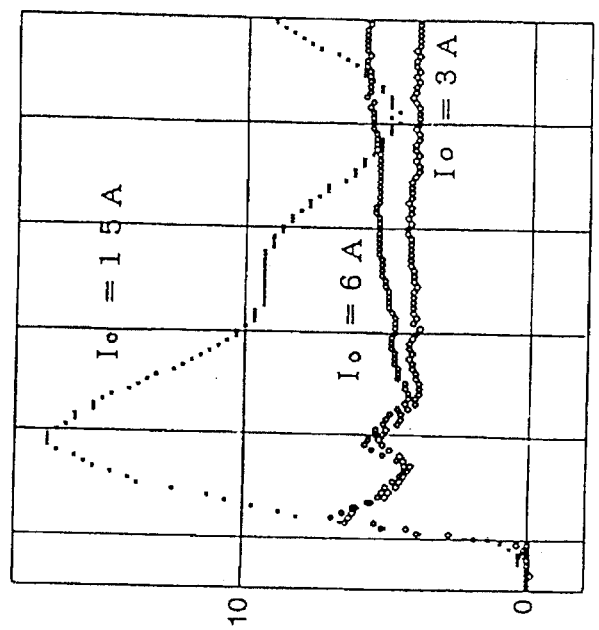
FIGS. 4(A) and 4(B) are graphs showing other examples of detected discharge current division.
Figure 4A:
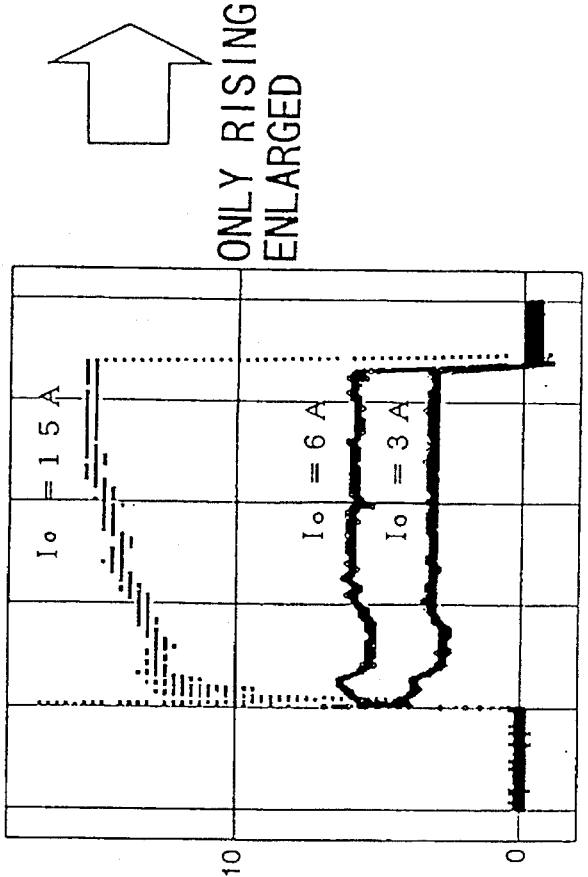
Figure 5:
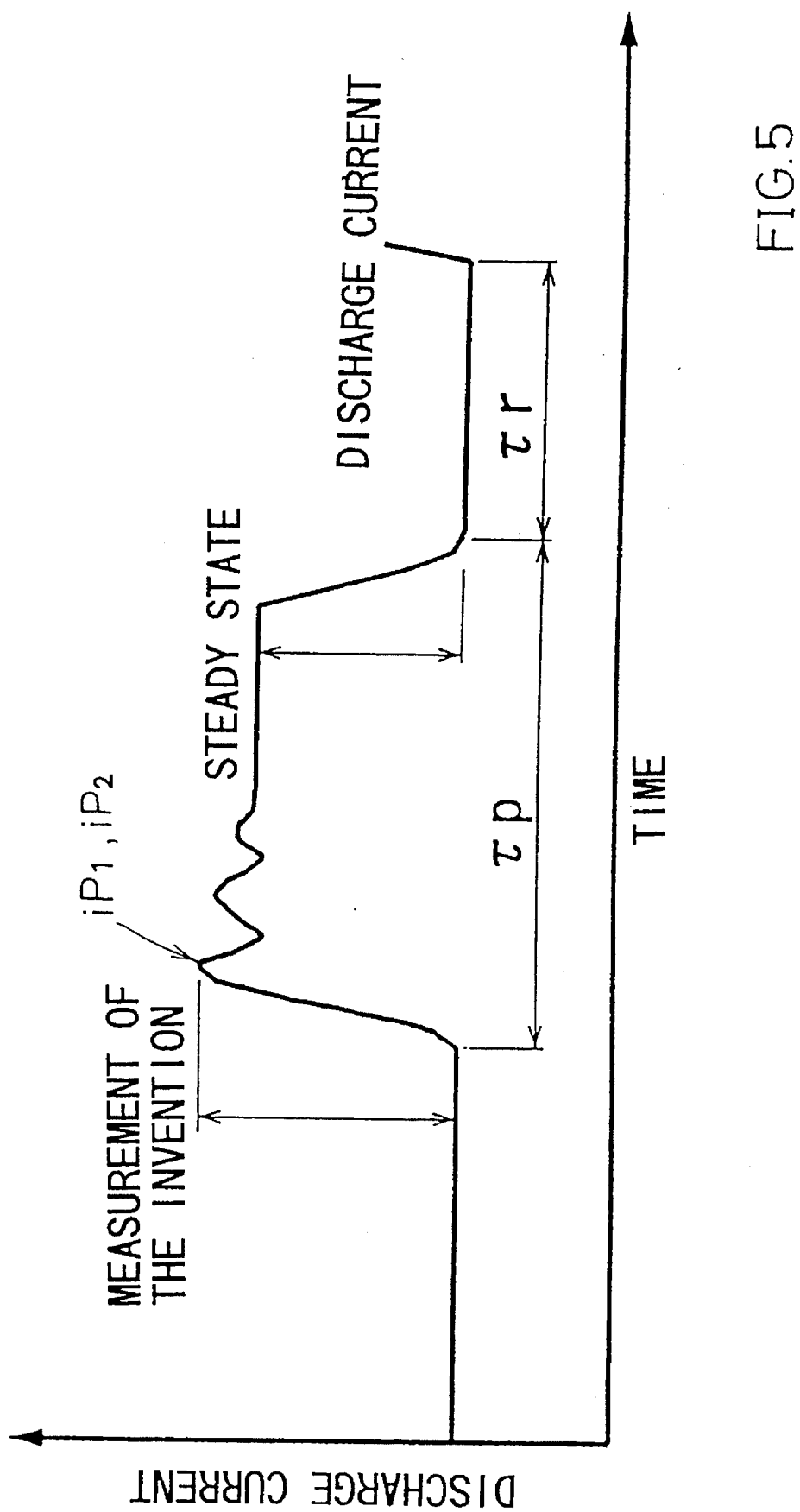
FIG. 5 is a graph showing a detected discharge current division common pattern.

FIGS. 4(A) and 4(B) show the discharge current division i1 detected by varying the value of the discharge current i0. It is confirmed that a sharp peak is detected commonly at the time of rising of the discharge current i0. FIG. 5 shows a common pattern as a result of detection. A common trend is recognized that a large current is caused at the time of rising of a pulse discharge current and is then oscillated to ultimately settle in a steady state.

The prior art electric discharge generation position detection process utilizes current in the steady state. Depending on conditions, a steady state may not be obtained unless about 24 μsec. has passed after the start of pulse energization, as is obvious from FIG. 4(A). Reduction of the pulse length to be 24 μsec. or below may result in inability of measurement. In the finish machining stage, a pulse length of several μsec. may be used. In this case, it is impossible to obtain measurement in the prior art. When the discharge current is set to i0=15 A, it is recognized that it has a trend of first going to a peak, then being reduced and then being slowly increased. The slow increase is thought to be due to the influence of the induced electromotive force.

Figure 6:
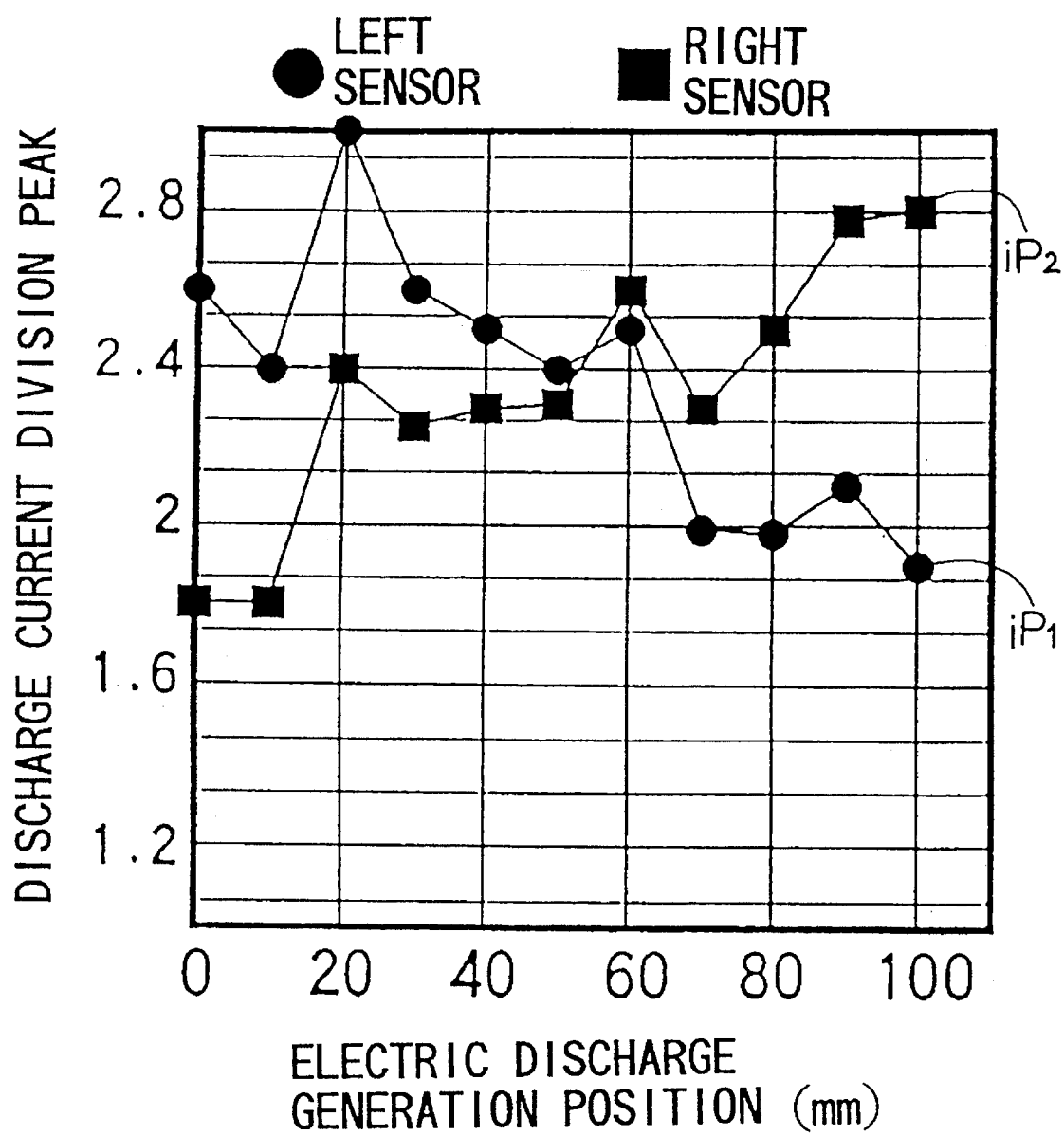
FIG. 6 is a graph showing the relation between the discharge generation position and the discharge current peak.

FIG. 6 is a graph which is obtained by detecting the discharge current divisions i1 and i2 while changing the relative positions of the pin p and the discharge electrode z, i.e., the electric discharge generation position, with an X movement mechanism in the XYZ movement mechanism, deriving the peaks iP1 and iP2 of the discharge current divisions i1 and i2 at the time of rising of the pulse discharge current i0 according to the result of detection and plotting the derived peak values iP1 and iP2 against electric discharge generation positions.

Figure 7:
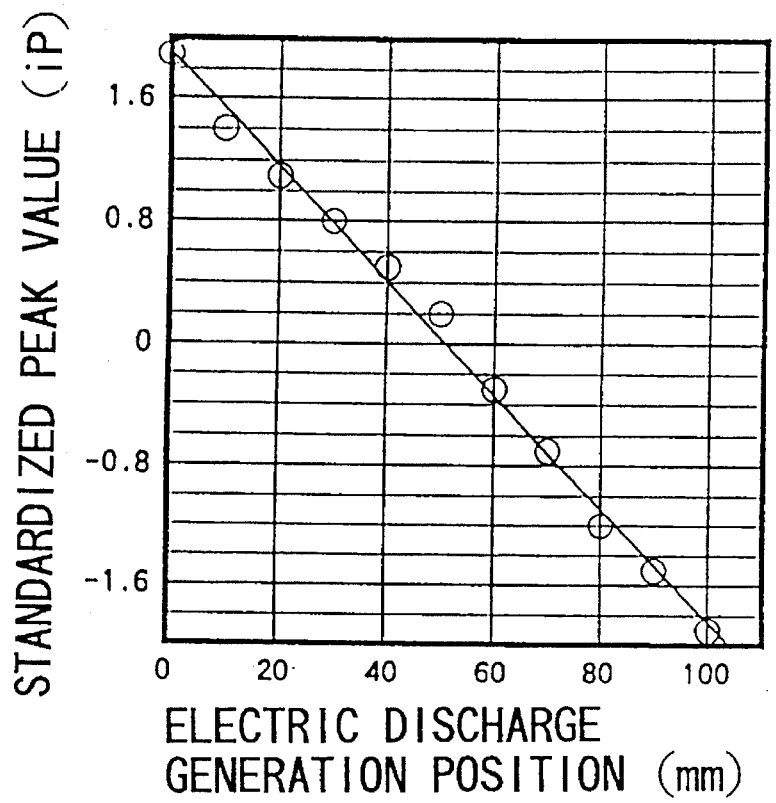
FIG. 7 is a graph showing the relation between the standardized value of peak and the electric discharge generation position (in case of graphite electrode)
Figure 8:
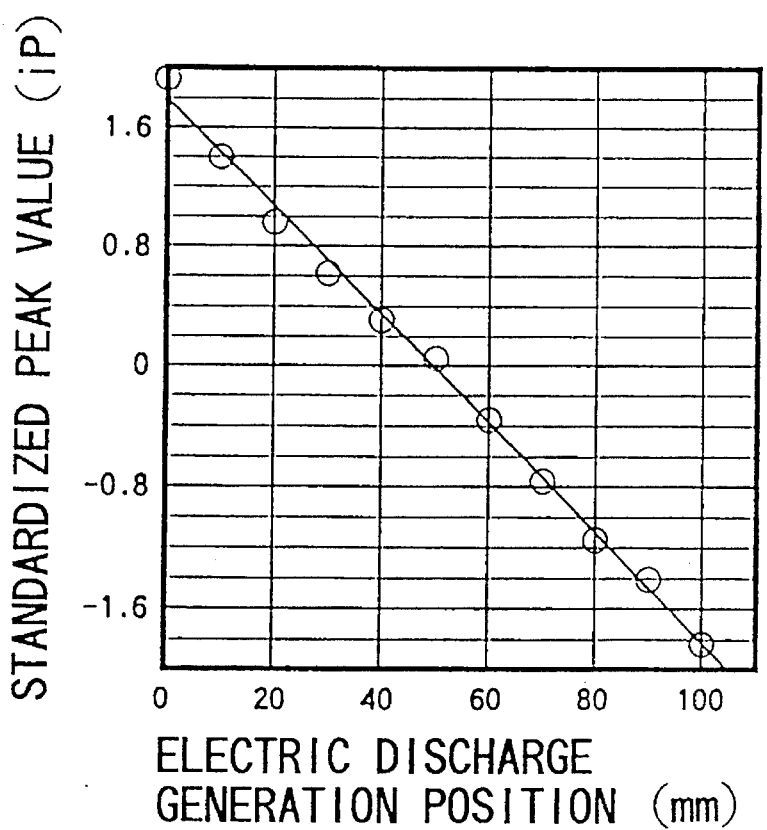
FIG. 8 is a graph showing the relation between the standardized peak value and the electric discharge generation position (in case of copper electrode)

FIGS. 7 and 8 are graphs obtained by standardizing the peak values iP1 and iP2 of the discharge current divisions i1 and i2 after an equation $$iP=(iP1-iP2)/(iP1+iP2)$$

and plotting the standardized values against electric discharge generation positions.

Figure 12A:
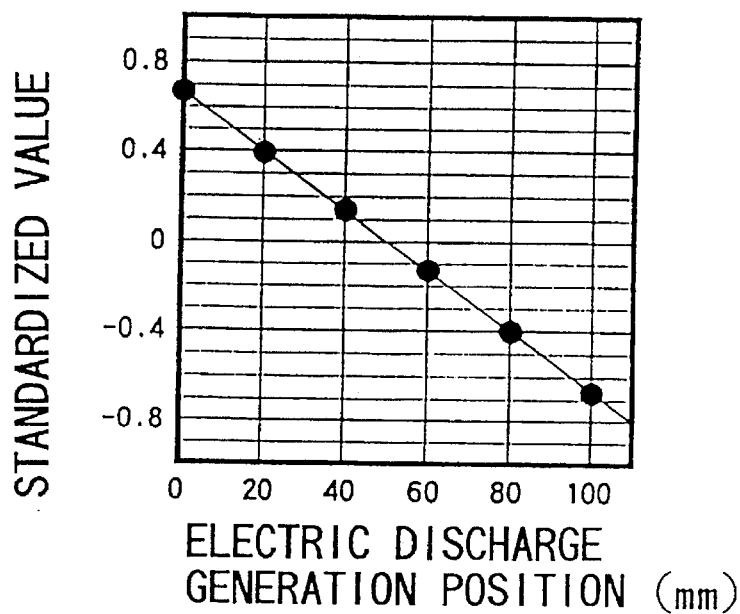
FIGS. 12(A) and 12(B) are graphs for explaining the prior art.
Figure 12B:
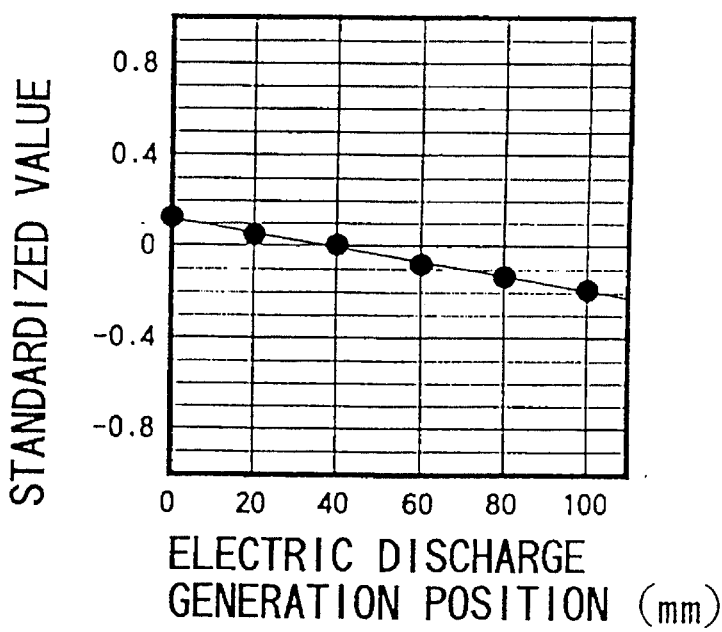

FIG. 7 concerns the case where the discharge electrode z is made of graphite, and FIG. 8 the case where the discharge electrode z is made of copper. It can be confirmed from the comparison of FIGS. 7 and 8 that in either case of graphite or copper, the standardized peak values iP well correspond to the electric discharge generation positions. In either of the two cases, the contribution factor is 99.6% and exhibits very high reliability. Further, it is confirmed that while copper is low in resistivity compared to graphite, in the case of copper, it is possible to calculate the electric discharge generation position substantially with the same sensitivity as in the case of graphite. This is very clearly shown in FIGS. 7 and 8 in comparison to FIG. 12(B).

Once the relation between the standardized peak value iP and the electric discharge generation position is grasped in the above way, the electric discharge generation position can be calculated from the standardized value iP by using the relation such as shown in FIG. 7 or FIG. 8. The step M5 according to the invention is implemented in this way.

In this embodiment, the electric discharge generation position is detected for every pulse energization in the above way. However, with the system shown in FIG. 2, it is impossible to obtain real time analysis because of low processing speed of the computer e. Accordingly, data is once taken in the digital oscilloscope d so that it is possible to obtain detailed analysis of what had happened during electric discharge machining. Instead of performing analysis for every electric discharge, it may be adopted to detect the electric discharge generation position at a pulse energization timing which is timed to the processing speed of the computer. By so doing, it is possible to obtain substantially real time processing. In other words, the electric discharge generation position is calculated not for every time of electric discharge but for one of every several ten times of electric discharge. Doing so permits the electric discharge generation position to be detected right after the electric discharge generation. In this way, it is possible to detect the distance of change in the electric discharge generation positions for every time of electric discharge (when detailed analysis is made afterwards) or for one of every several ten times of electric discharge (for real time processing).

Figure 9:
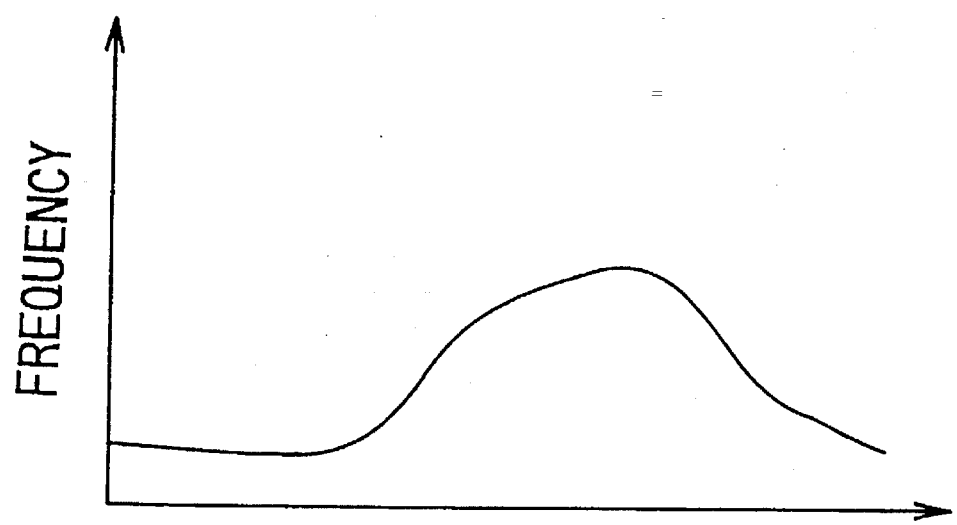
FIG. 9 is a graph showing an example of histogram of distance between electric discharge generation positions.

FIG. 9 is a histogram showing the distance calculated in the above way. From this histogram, it will be seen that electric discharge is generated concentratedly in a particular range in case when distances between discharge positions are concentrated in a small range. In such a case, the electric discharge machining is not executed in a satisfactory state. On the other hand, it will be seen that in case when the average distance between the electric discharge positions is large, electric discharge is generated in a dispersed state in the average in various parts of the discharge electrode. In this case, it is seen that the electric discharge machining is executed in a satisfactory state.

In this embodiment, the average distance between electric discharge positions is calculated, and when this average distance is less than a fixed threshold value, a signal indicative of the concentration of the electric discharge is outputted from the computer e to the electric discharge machine controller. When this signal is supplied, the electric discharge machine controller executes a process of increasing applied voltage to increase jump distance or jump frequency or distance between the work and the discharge electrode, thus updating the electric discharge machining conditions such as to make up for the electric discharge concentration. In this way, the step M7 according to the invention is realized.

In lieu of executing the judgment in the step M6 through comparison of the average distance between electric discharge positions with the threshold value, it is possible to permit judgment as to whether electric discharge is concentrated or dispersed through comparison of the number of times of generation of electric discharge when the distance between discharge positions becomes greater than a constant one with the number of times of generation of electric discharge when the distance between discharge positions becomes less than a constant one.

The above embodiment has been described in relation to the case where the discharge electrode z extends one-dimensionally. In this case, power is supplied from the two points y1 and y2. Where the discharge electrode z is spread in the XY plane, by supplying power to the discharge electrode from two points in the X direction and two points in the Y direction and adopting the process according to the invention for the two points in each of the X and Y directions, the electric discharge generation position calculation can be obtained with respect to each of the X and Y directions.

Figure 10A:
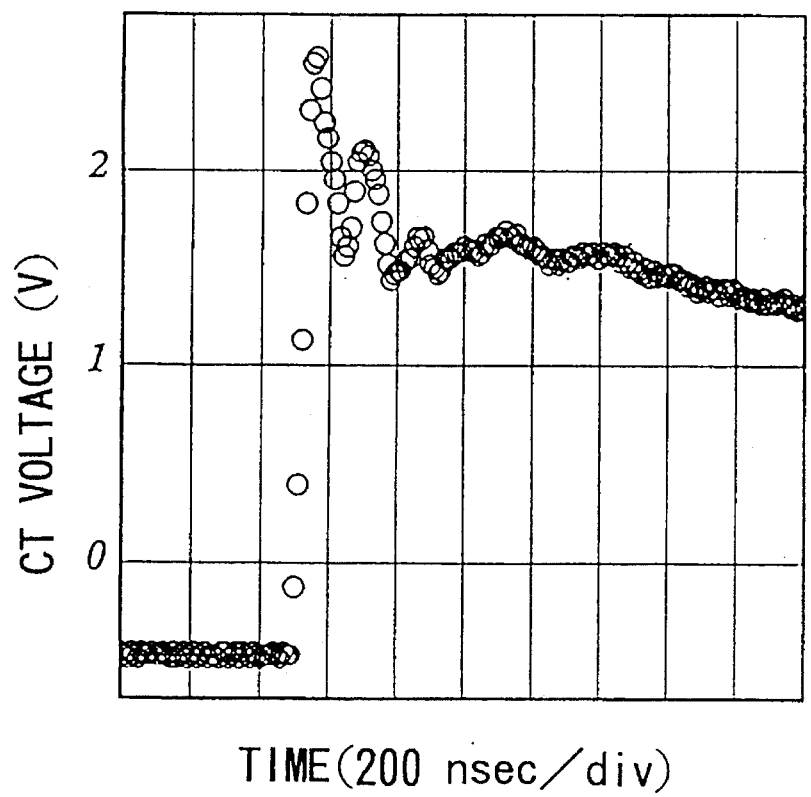
FIG. 10(A) is a graph showing an example of detected discharge current division in case of utilizing a superimposing circuit.
Figure 10B:
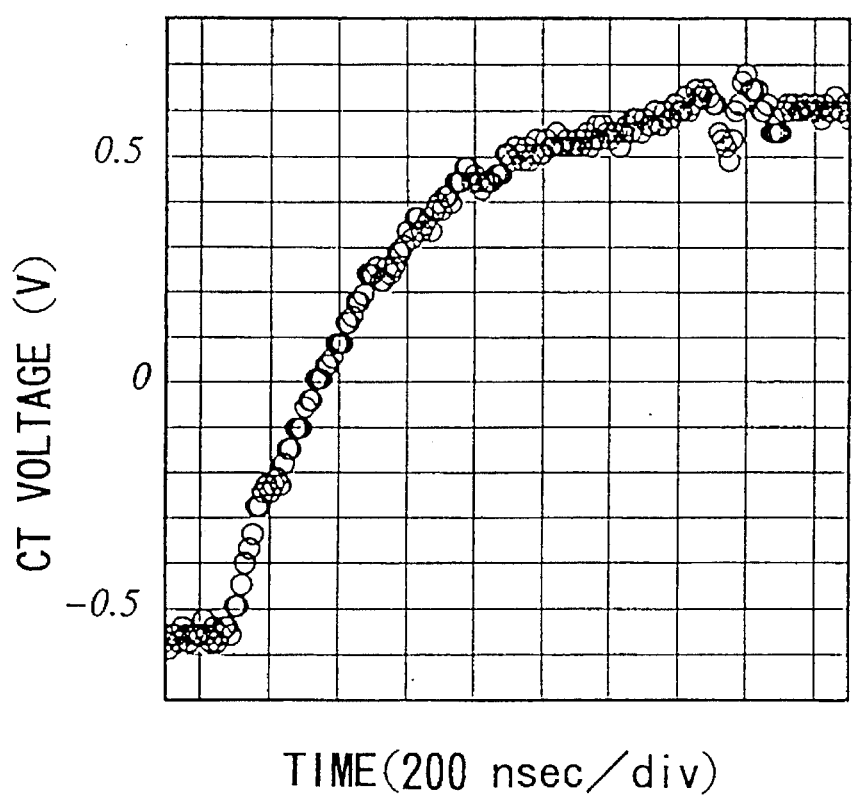
FIG. 10(B) is a graph showing an example of detected discharge current division in case of utilizing no superimposing current.
Figure 11A:
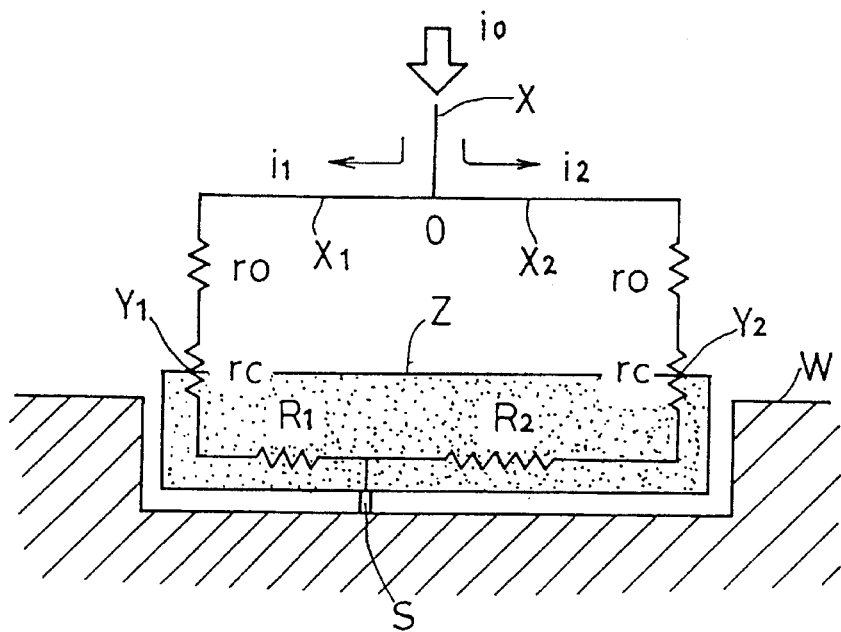
FIGS. 11(A) and 11(B) illustrate the prior art.
Figure 11B:
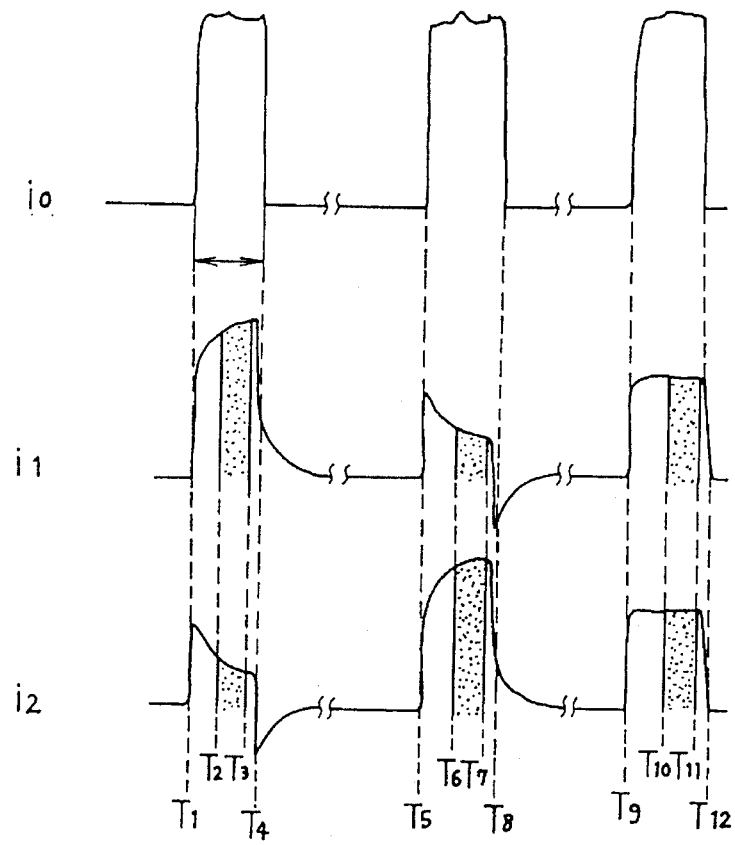

The process according to the invention can not be applied without any exception. FIG. 10(B) shows an example of discharge current division detected when the voltage applied to the discharge electrode is not increased in the finish machining stage. In this case, no peak is detected. In such a case, the process according to the invention can not be applied. In contrast, FIG. 10(A) shows a case when the voltage is increased by a superimposing circuit in the finish machining stage. In this case, a peak is clearly recognized. It is not an essential problem that no peak is generated unless voltage is increased, because the finish quality can not be made better without increase of voltage in the finish machining stage. The phenomenon that no peak can be obtained also arises when the work and the discharge electrode are short-circuited to each other by a dust particle or the like. During satisfactory machining, however, a peak is usually recognized, and the electric discharge generation position can be detected by the process according to the invention.

While a preferred embodiment of the invention has been described in the foregoing, various changes and modifications thereof may be made without departing from the scope and spirit of the invention. For example, while in the above embodiment, the peak current is utilized for the electric discharge generation position detection, it is also possible to utilize, for the same end, the variable length of the discharge current divisions that is generated when the pulse discharge current is "off".

According to the invention, the electric discharge generation position detection is obtainable without any restriction imposed by the pulse length of the pulse discharge current or by the material of the discharge electrode. It is thus possible to obtain accurate electric discharge generation position detection in the finish machining stage or the like where the electric discharge generation position detection is most necessary, or at the time of machining by using a copper discharge electrode.

Further, according to the invention, the electric discharge machining is made while detecting the electric discharge generation position. Thus, electric discharge generation position concentration indicative of unsatisfactory electric discharge machining being in force is detected, and in such a case, the conditions of the electric discharge machining are updated such as to remove the state of electric discharge concentration. Thus, the electric discharge machining can be continued in satisfactory state.

What is claimed is:

1. A process of detecting the position of generation of electric discharge between a discharge electrode of an electric discharge machine and a work, comprising the steps of:

branching a pulse discharge current into two or more branch power supply lines and supplying discharge current divisions to a discharge electrode from two or more points through the respective branch power supply lines;

detecting the discharge current divisions in the branch power supply lines;

calculating the peak value of each of the discharge current divisions at the time of rising of the pulse discharge current;

standardizing the peak value of each of the discharge current divisions; and calculating electric discharge generation position according to the standardized peak value.

2. The process as defined in claim 1, further comprising the step of judging, from changes in the calculated electric discharge generation positions, whether electric discharge generation positions are concentrated or dispersed.

3. A process of electric discharge machining while detecting the position of generation of electric discharge between a discharge electrode of an electric discharge machine and a work, comprising the steps of:

branching a pulse discharge current into two or more branch power supply lines and supplying discharge current divisions to a discharge electrode from two or more points through the respective branch power supply lines;

detecting the discharge current divisions in the branch power supply lines;

calculating the peak value of each of the discharge current divisions at the time of rising of the pulse discharge current;

standardizing the peak value of each of the discharge current divisions;

calculating electric discharge generation position according to the standardized peak value;

judging, from changes in the calculated electric discharge generation positions, whether the electric discharge generation positions are concentrated or dispersed; and updating machining conditions when the electric discharge generation positions are concentrated.

4. The process as defined in claim 3, wherein a voltage applied to the discharge electrode is increased in the updating process.

5. A device of detecting the position of generation of electric discharge between a discharge electrode of an electric discharge machine and a work, comprising:

a plurality of branched power supply lines from a common power supply line;

a discharge electrode of an electric discharge machine, the discharge electrode being connected to the branched power supply lines at different points;

a power source for applying a series of pulsed voltage to the common power supply line;

a plurality of detectors each operable to detect a discharge current division flowing through each branched power supply line;

a calculator for calculating each peak value of each discharge current division, for standardizing peak values of discharge current divisions, and for calculating an electric discharge generation position from the standardized value.

6. The device as defined in claim 5, further comprising a recorder for recording discharge current divisions detected by the detectors.

* * * * *